United States Patent [19]

Stutler et al.

[11] Patent Number: 4,631,662
[45] Date of Patent: Dec. 23, 1986

[54] SCANNING ALARM ELECTRONIC PROCESSOR

[75] Inventors: Richard A. Stutler, King George, Va.; Jeffrey T. Harris, Palm Bay, Fla.

[73] Assignee: The United States of America as represented by the Secretary of the Navy, Washington, D.C.

[21] Appl. No.: 628,093

[22] Filed: Jul. 5, 1984

[51] Int. Cl.[4] .................................................. G06F 9/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,771,138 | 11/1973 | Celtruda et al. | 364/200 |
| 4,228,498 | 10/1980 | Moshier | 364/200 |
| 4,309,691 | 1/1982 | Castleman | 364/200 |
| 4,320,453 | 3/1982 | Roberts et al. | 364/200 |
| 4,439,827 | 3/1984 | Wilkes | 364/200 |

Primary Examiner—Eddie P. Chan
Attorney, Agent, or Firm—Kenneth E. Walden; John G. Wynn

[57] ABSTRACT

A scanning alarm electronic processor [hereinafter SAEP] for receiving and evaluating a predetermined number of analog signals is configured to perform, inter alia, high speed/high resolution analog computations thereon using micro-programmable methods and devices. The SAEP uses unique, parallel pipeline processing of certain functions to obtain the desired high sample rates. The SAEP is divided into two sections which contribute to its high speed performance. Each section contains the circuitry; i.e., modules, necessary to perform the algorithms for half of the predetermined number of analog signals. A common central processing unit module ties the two sections together. The SAEP operates to compute a droop compensated differential voltage for each one of the predetermined number of analog signals, to compute a weighted sum of the differential voltages, and to compare the weighted sum with an absolute value and perform an alarm evaluation.

5 Claims, 6 Drawing Figures

SCANNING ALARM ELECTRONIC PROCESSOR

BACKGROUND OF THE INVENTION

1. Field of the Invention

The present invention relates generally to an apparatus for processing analog singals representative of a continuously changing and, prehaps, toxic chemical environment, but more specifically the present invention relations to an apparatus having a unique parallel pipeline processor type of architecture for processing a large amount of analog data.

2. Description of the Prior Art

In the field of high performance digital and analog computation, there have been many techniques developed for improving the speed and resolution at which a computer can execute instructions and process data. One of the most well known approaches known in the prior art is to simply improve the performance of the computer by optimizing the system architecture.

A particular example of such an advanced approach to improving the speed at which computers can process instructions is the development of the pipeline processor. These processors can perform many instructions at very high speeds because of their internal organization. In the generic sense, a pipeline processor actually performs several operations on several different instructions simultaneously. For example, one instruction might call for an operation upon two operands contained within the main memory of the computer. These operands might be fetched from the main memory during the same period of time that a second instruction was being decoded to determine its type as well as its data requirements. Still a third instruction might be nearing its completion, all in the same machine cycle.

Although the generic pipeline processor is highly efficient as compared to other data processors, the pipeline data processor has an inherent problem which prevents maximum utilization of its data processing capability. Due to program dependencies, even a pipeline processor can be put into a waiting state while data is being fetched from the main memory. During these waiting periods, even a pipeline processor can not utilize all of its available processing capability. Some of these inherent problems with the generic pipeline processor have been solved and their solution is disclosed in the U.S. Pat. No. 3,771,138, filed Aug. 31, 1971, to Celtruda et al, entitled, "Apparatus and Method for Serializing Instructions From Two Independent Instruction Streams", patent granted Nov. 6, 1973. Accordingly, Celtruda et al is of general interest as to generic pipeline architecture.

Since a pipeline processor is a very complicated data processing unit, designing a system with a pipeline processor capable of processing instructions simultaneously from two different instruction streams requires a certain amount of sophisticated hardware to perform the buffer and the selection functions. Consequently, there is a need in the prior art to configure a unique pipeline processor containing the required circuitry to perform the instruction interleaving function which is required in order to share the pipeline processor between two instruction streams, i.e., split sections.

The parallel pipeline processor, according to the present invention is divided into separate functional and physical modules. By control of a control module portion, the results of one module are fed to the next in a cascaded manner. This pipelining allows for a higher throughput speed in that each module is always computing data based on results obtained by a previous module rather than one module during all of the calculations in a serial fashion. The processor itself is essentially a micro-program device.

The prior art, as indicated hereinabove, included many advances in processors of the pipeline type, including those that are configured to increase the processing of data. However, insofar as can be determined, no prior art pipeline processor incorporates all of the features and advantages of the present invention.

OBJECTS OF THE INVENTION

An important object of the present invention is to condition and evaluate a predetermined number of analog signals representative of the outputs of a corresponding number of segments of an electro-optical sensor, for example, in an improved manner.

A corollary object of the above object is to perform the foregoing analog computations with high sample rates and high resolution in an improved manner.

Another important object of the present invention is to configure a scanning alarm electronic processor to accomplish the foregoing by incorporating a unique micro-programmable parallel pipeline processor type of circuit architecture therein.

A corollary object of the above object is to compute a droop compensated differential voltage for each of the predetermined number of analog voltages in an improved manner.

A corollary object of the last mentioned object is to compute a weighted sum of these differential voltages in an improved manner.

A corollary object of the previously mentioned object is to compare the weighted sum with a predetermined absolute value and with the result, perform an alarm evaluation.

Yet another object of the present invention is to physically divide the scanning alarm electronic processor into two sections so that each section contains the circuitry necessary to perform the algorithms for half of the predetermined number of analog signals for ease of construction and maintenance as well as speed of operation.

A corollary object of the last mentioned object is to further divide the two sections into corresponding separate functional and physical modules for further enhancement of the speed of operation and ease of implementation as well as for flexibility of design.

SUMMARY OF THE INVENTION

In accordance with the above stated objects, other objects, features and advantages, the primary purpose of the scanning alarm electronic processor, according to the present invention, is to receive and evaluate, in reference to a predetermined absolute value, a predetermined number of analog signals so as to perform high speed and high resolution analog computations thereon.

The essence of the present invention is in configuring the scanning alarm electronic processor to incorporate a unique micro-programmable parallel pipeline processor type of circuit architecture in order to obtain the desired high sample rates required.

The purpose of the present invention is carried out by configuring the scanning alarm electronic processor to include two identical sections, each containing the circuitry, i.e., modules, to perform the algorithms for half of the predetermined analog signals. Each section comprises an analog-to-digital module having a separate channel for each one of the designated analog signals, a memory module operatively connected to the analog-to-digital module and having a corresponding separate channel for each of the designed analog signals, an arithmetic logic unit module operatively connected to the memory module for performing a predetermined number of logic, arithmetic and related operations, a control module operatively connected to the analog-to-digital module, the memory module and the arithmetic logic unit module for generating a predetermined number of control signals so as to control the input/output operations thereof, and a common central processing unit for tying together the two sections comprising the scanning alarm electronic processor and being operatively connected to the control modules, the arithmetic logic unit modules and the analog-to-digital modules of each section so as to provide central timing and control thereof, and an alarm evaluation corresponding to predetermined characteristics of the predetermined number of analog signals.

BRIEF DESCRIPTION OF THE DRAWINGS

The previously stated objects, other objects features and advantages of the present invention will be apparent from the following more particular description of the preferred embodiment as illustrated in the accompanying drawings, in which.

DESCRIPTION OF THE PREFERRED EMBODIMENT

Figure 1:
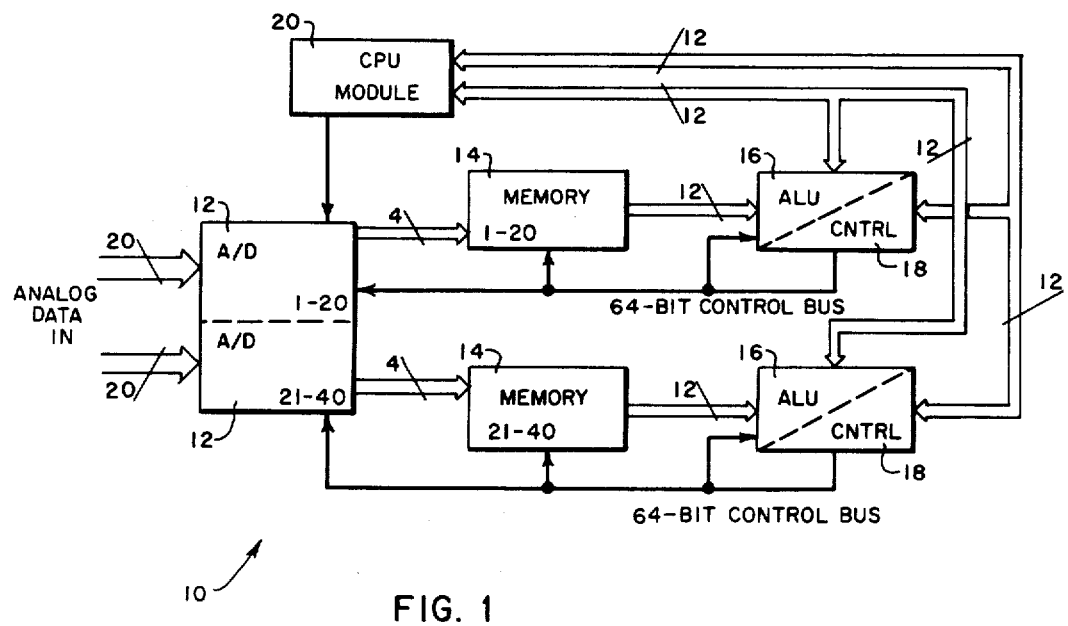
FIG. 1 is an overall block diagram representation of the scanning alarm electronic processor according to the present invention depicting, inter alia, its unique pipeline processor type of architecture, its two identical split sections, its analog-to-digital module, memory module, arithmetic logic unit module and control module comprising each of the split identical sections, and its common central processing unit module tying the two sections together.

FIG. 1 shows a scanning alarm electronic processor (SAEP) 10 employing the present invention. It comprises a plurality of analog-to-digital (A/D) modules 12, a plurality of memory modules 14, a plurality of arithmetric logic unit (ALU) modules 16, a plurality of control modules 18 and a common central processor unit (CPU) module.

For the embodiment shown in FIG. 1, the SAEP 10 is physically divided into two identical sections. It should be clear, however, that more than two sections can be used if desired. For the particular application disclosed, the ease of design and troubleshooting as well as for speed considerations mandated the two section approach. As also shown, the SAEP 10 of FIG. 1 is also further divided into separate functional and physical modules like those aforementioned. Accordingly, each section, as shown, contains the circuitry to perform the algorithms for 20 channels making a total of 40 channels. Thus, half of the analog data numbering in sequence from 1–20 date points is fed into the input of one of the A/D modules 12 and the other half of the analog data numbering in sequence from 21–40 is fed into the input of the other one of the A/D modules 12. The outputs of these modules feed the inputs of corresponding ones of the memory modules 14, which, in turn, feed corresponding ones of the ALU modules 16. Corresponding ones of the aforementioned ALU modules 16 are operatively connected to corresponding ones of the control modules 18. These modules, inter alia, feed control signals to corresponding ones of the aforementioned ALU modules 16, the memory modules 14 and the A/D modules 12. The common CPU module being connected to the control modules 18, the ALU modules 16 and the A/D modules 12 of each section of the SAEP 10, operates to tie the two sections together.

Figure 2:
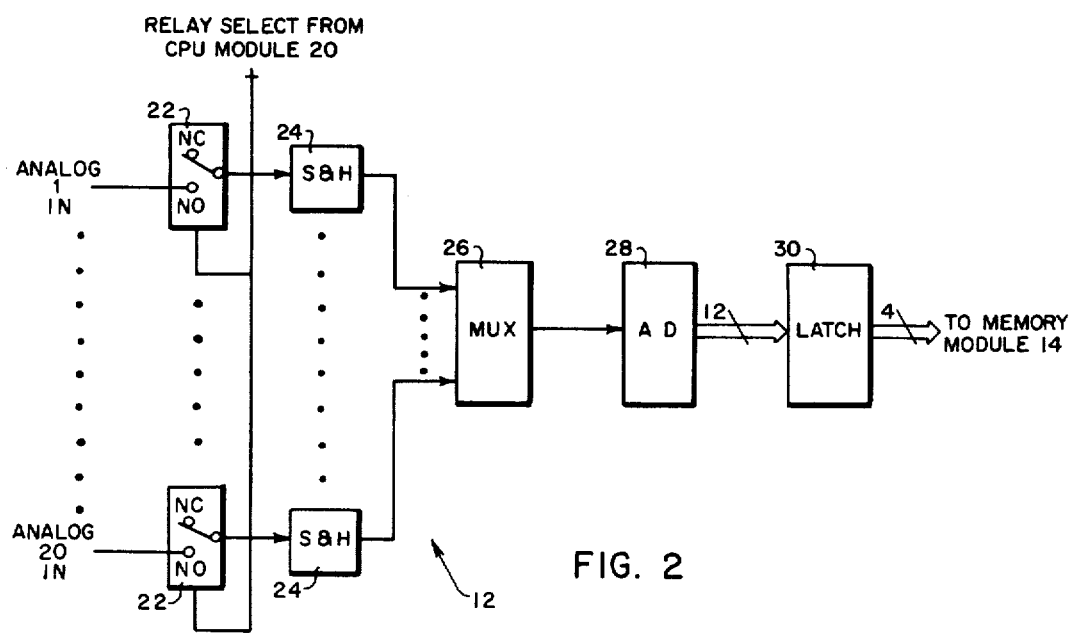
FIG. 2 is a detailed block diagram of the analog-to-digital module of the scanning alarm electronic processor of FIG. 1.

Referring now to FIG. 2, a typical one of the A/D modules 12 comprises a plurality of relays 22, a corresponding plurality of sample-and-hold circuits 24, an analog multiplexer 26, an analog-to-digital (A/D) converter 28 and an A/D module interface latch 30. All of the analog signals are brought to the A/D module 12 through the normally opened (NO) contacts of the plurality of relays 22. As shown, the plurality of relays 22 are actuated by a relay select signal from the CPU module 20, which allows the analog input signal(s) to be fed to the inputs of corresponding ones of the plurality of sample-and-hold circuits 24. The outputs of the plurality of sample-and-hold circuits 24 are brought to the inputs of the analog multiplex 26, which, in turn, feeds the input of the A/D converter 28. As shown, the A/D converter 28 is initiated by a start signal from the corresponding one of the control module 18, which allows the conversion process to take place so as to produce a digital signal. Next, the A/D converter 28 cooperates with the A/D module interface latch 30 so that the digital signal, representative of a digital value for the analog signal, is strobed into the aforementioned A/D interface latch 30. The output of the A/D interface latch 30, in turn, drives the corresponding one of the plurality of memory modules 14.

Figure 3:
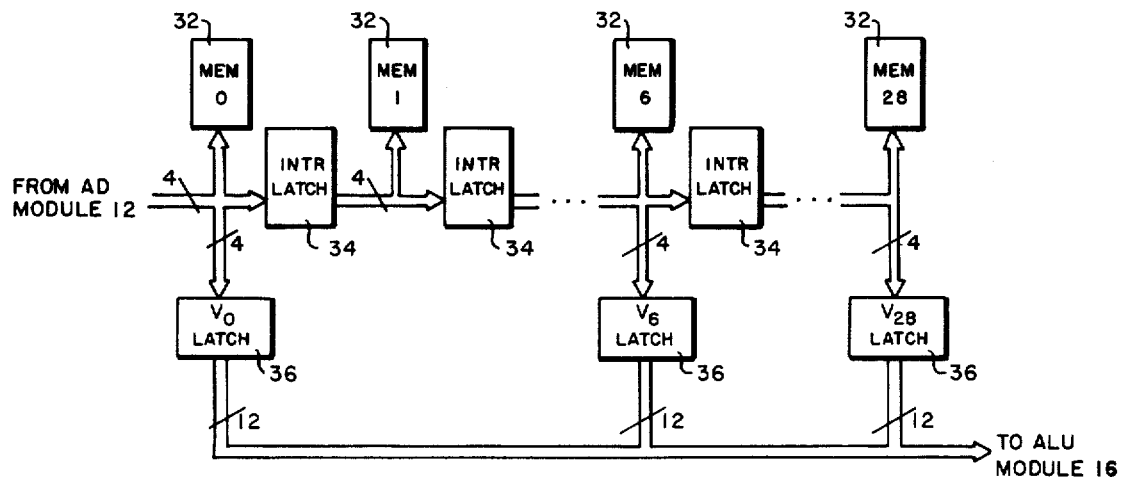
FIG. 3 is a detailed block diagram of the memory module of the scaning alarm electronic processor of FIG. 1.

Referring now specifically to FIG. 3, but also to FIGS. 1 and 2, as viewed concurrently, a typical one of the plurality of memory modules 14 comprises a plurality of memory chips 32, a plurality of intervening latches 34 and a plurality of memory module interface latches 36. As depicted, the output of the A/D module interface latch 30 is operatively connected to a memory (0) of the plurality of memory chips 32, to an intervening latch (1) of the plurality of intervening latches 34 and to an interface latch $V_0$ of the plurality of memory module interface latches 36. The signal(s) out of the intervening latch (1) is operatively connected to a memory (1) of the plurality of memory chips 32 and to an intervening latch (2) of the plurality of intervening latches 34. Thus, the input signal(s) to the typical one of the plurality of memory modules 14 is passed down in a "bucket brigade" fashion such that the output of an intervening latch (6) (not shown) is operatively connected to a memory (6) of the plurality of memory chips 32, to an intervening latch (7) of the plurality of intervening latches 34 and to an interface latch V$_6$ of the plurality of memory module interface latches 36. The signal(s) continue to be passed such that the output of an intervening latch (28) (not shown) is operatively connected, as shown, to a memory (28) of the plurality of micro-memory chips 32, and to an interface latch V$_{28}$ of the plurality of interface latches 36. As depicted, the outputs of the aforementioned interface latches V$_0$, V$_6$ and V$_{28}$ are fashioned into a bus and becomes the output of the typical one of the plurality of memory modules 14. This output, in turn, drives the corresponding one of the plurality of ALU modules 16.

Figure 4:
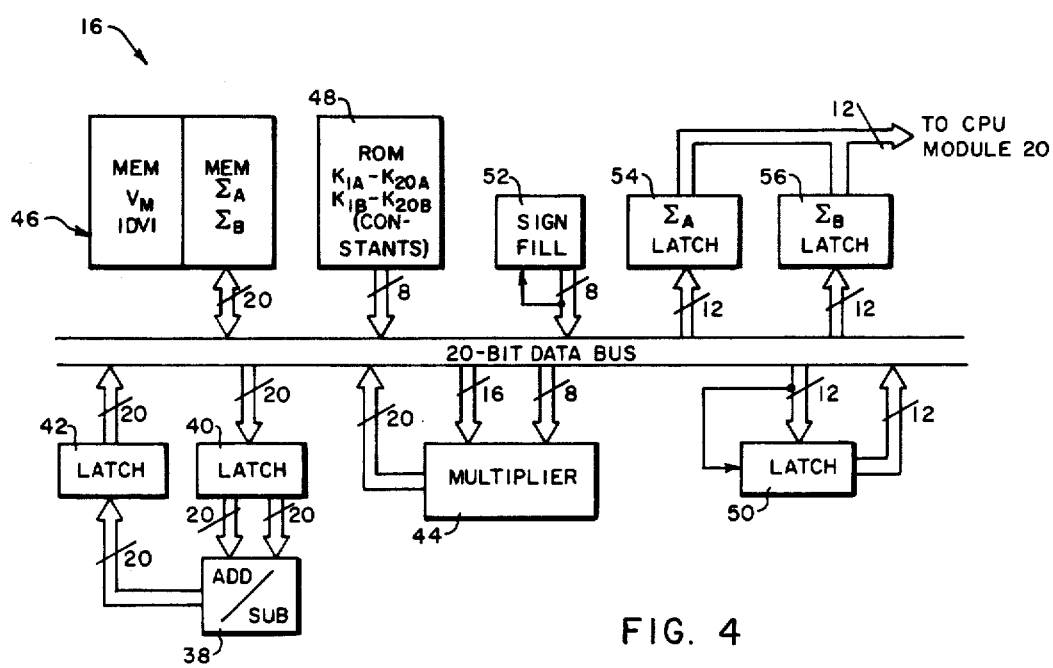
FIG. 4 is a detailed block diagram of the arithmetic logic unit module of the scanning alarm electronic processor of FIG. 1.

Referring now specifically to FIG. 4, but also to FIGS. 1, 2 and 3, as viewed concurrently, a typical one of the plurality of ALU modules 14 comprises an adder/substractor (A/S) circuit 38, and A/S circuit input latch 40, an A/S circuit output latch 42, a multiplier 44, an ALU module random access memory (RAM) 46, an ALU module read-only memory (ROM) 48, a less-than-zero detector 50, a sign fill circuit 52, a first accumulator latch 54 and a second accumulator latch 56. As shown, all data within the typical one of the plurality of ALU modules 16, from the various components thereof, as aforementioned, are operatively connected, and, accordingly, transferred via an internal 20-bit data bus. The A/S circuit 38 is operatively connected to the 20-bit data bus by taking data off of the 20-bit data bus via the A/S circuit input latch 40. Data is outputted onto the 20-bit data bus from the A/S circuit 38 via the A/S circuit output latch 42. All other components are operatively connected directly to the 20-bit data bus as illustrated. All functions in the ALU module 16 are performed under the supervision of the control module being operatively connected to the components of the ALU module 16 indicated. The data are sent out of the ALU module 16 via the first and second accumulators 54 and 56, respectively, to the CPU module 20.

Figure 5:
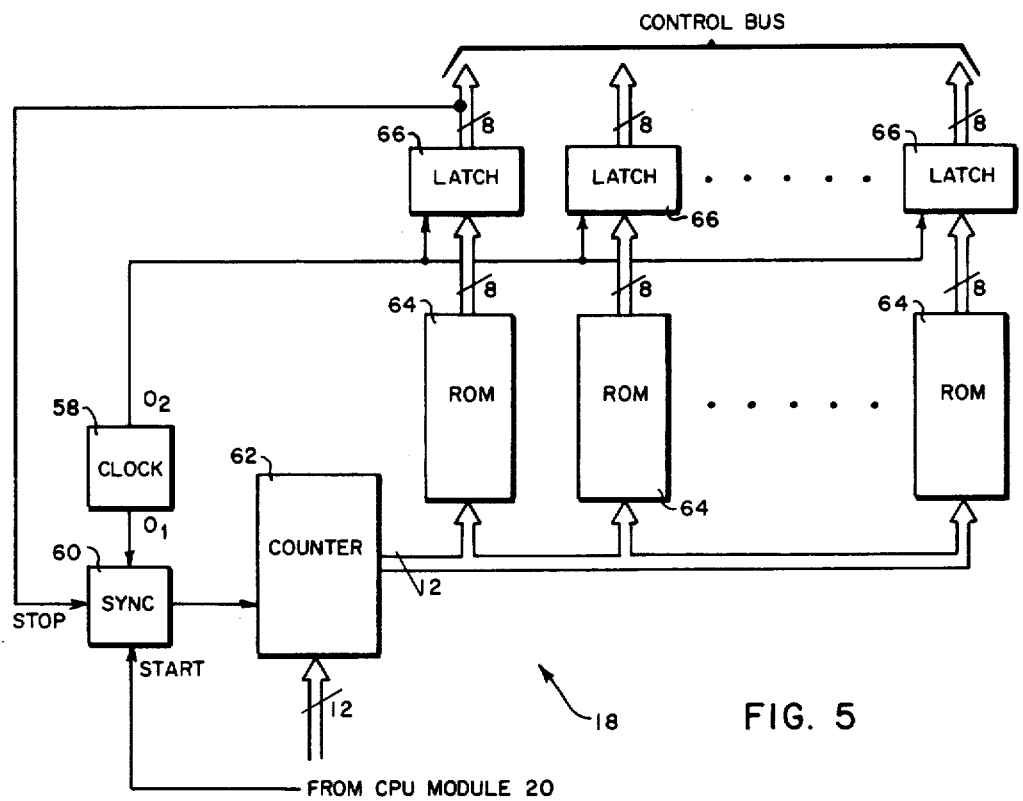
FIG. 5 is a detailed block diagram of the control module, of the scanning alarm electronic processor of FIG. 1, depicting, inter alia, its two phase clock.

Referring this time specifically to FIG. 5, but also to FIGS. 1, 2, 3 and 4, as viewed concurrently, a typical one of the plurality of control modules 18 comprises a two-phase clock generator 58, a synchronization circuit 60, an address counter 62, a plurality of control read-only memories (ROMs) 64 and a plurality of control ROMs output latches 66. As illustrated, one phase, $\phi_1$, of the two-phase clock generator 58 is operatively connected to the synchronization circuit 60. The other phase, $\phi_2$, thereof is operatively connected to the plurality of control ROMs output latches 66. The CPU module 20 is operatively connected to the address counter 62 and the synchronization circuit 60 which, in turn, feeds the aforementioned address counter 62. The output of the address counter 62 is operatively connected to the plurality of control ROMs 64 which are connected at their outputs to corresponding ones of the aforementioned control ROMs output latches 66. The control ROMs latch (1) of the plurality of control ROMs latches 66 is also operatively connected to the synchronization circuit 60 via a control line as shown. The output of the control module 18 is formulated at the outputs of the plurality of control ROMs output latches 66 on the control bus. This bus feeds the corresponding ones of the plurality of ALU modules 16, the plurality of memory modules 14 and the plurality of A/D modules 12.

Figure 6:
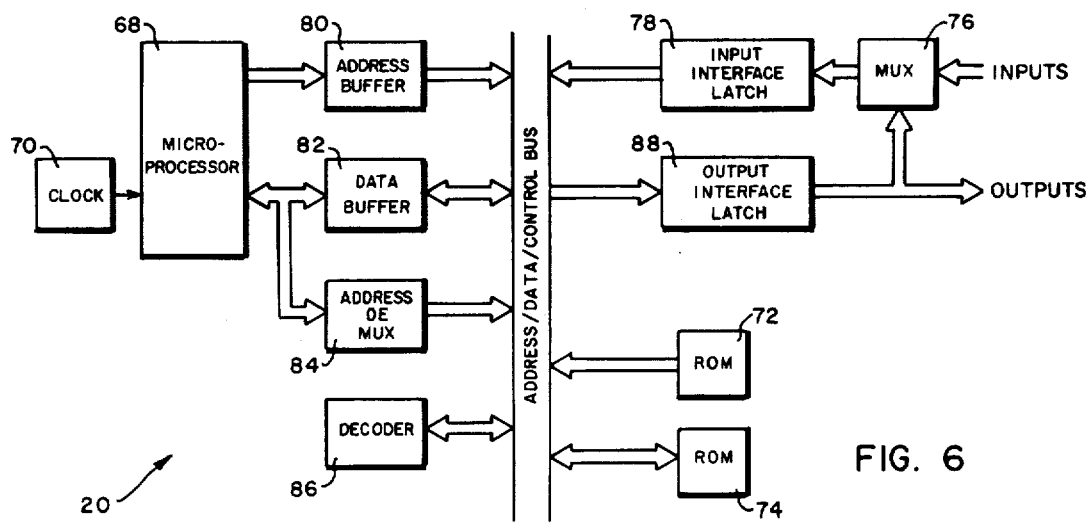
FIG. 6 is a detailed block diagram of the common central processing unit module of the scanning alarm electronic processor of FIG. 1.

Referring specifically to FIG. 6, but also to FIGS. 1, 2, 3, 4 and 5, as viewed concurrently, the common CPU module 20 microprocessor 68, a CPU clock 70, a CPU read-only memory (ROM) 72, a CPU random access memory (RAM) 74, a CPU input multiplexer 76, a CPU input interface latch 78, an address buffer 80, a data buffer 82, an address de-multiplexer 84, a decoder 86 and a CPU output interface latch 88. As depicted, the CPU clock 70 is operatively connected to the microprocessor 68, which, in turn, is operatively connected, and, accordingly, communicates with the address-/data/control, but via the address buffer 80, the data buffer 82 and the address de-multiplexer 84. The CPU ROM 72, the CPU RAM 74 and the decoder 86 are operatively connected directly to the aforementioned address/data/control bus as shown. The input data to the CPU module 20 are via the CPU input multiplexer 76, which is also operatively connected to the CPU output latch 88. The input of the CPU output latch 88 feeds off of the address/data/control bus while the output of the CPU input multiplexer 76 feeds the CPU input interface latch 78 whose output is operatively connected to the aforementioned address/data/control bus.

To those skilled in the art, many modifications and variations of the present invention are possible in light of the above teachings. It is therefore to be understood that the present invention can be practiced otherwise then as specifically described herein and still be within the spirit and scope of the appended claims.

What is claimed is:

1. A scanning alarm electronic processor (SAEP) for receiving and evaluating a predetermined number of analog signals, said SAEP being physically divided into two sections each section being configured to process halve of the predetermined number of analog signals, said SAEP comprising:

a plurality of first section analog-to-digital (A/D) modules operatively connected at their inputs to half of the predetermined number of analog signals;

a plurality of first section memory modules operatively connected to corresponding ones of said plurality of first section A/D modules;

a plurality of first section arithmetic logic unit (ALU) modules operatively connected to corresponding ones of said plurality of first section memory modules;

a plurality of first section control modules operatively connected to corresponding ones of said plurality of first section ALU modules, memory modules, and A/D modules;

a plurality of second section A/D modules operatively connected at their inputs to the other half of the predetermined number of analog signals;

a plurality of second section memory modules operatively connected to corresponding ones of said plurality second section of A/D modules;

a plurality of second section ALU modules operatively connected to corresponding ones of said plurality of second section memory modules;

a plurality of second section control modules operatively connected to corresponding ones of said plurality of second section ALU modules, memory modules, and A/D modules;

said pluralities of first and second section analog-to-digital modules, memory modules, arithmetic logic units and control modules being connected to their respective preceeding input devices and succeeding output devices in pipeline fashion, and a common central processor unit (CPU) module operatively connected to both of said first and second section plurality of control modules, and operatively connected to both of said first and second section plurality of A/D modules, and ALU modules so as to coordinate the first and second sections together in a parallel pipeline fashion to increase the processing speed.

2. The processor of claim 1 wherein said A/D module comprises:
   a plurality of relays;
   a corresponding plurality of sample-and-hold circuits operatively connected to said relays;
   an analog multiplexer operatively connected to said plurality of sample-and-hold circuits;
   an analog-to-digital (A/D) converter operatively connected to said analog multiplexer; and
   an A/D module interface latch operatively connected at its input to said A/D converter and at its output to said memory module, said plurality of relays being actuated by a relay select signal from said CPU module so as to feed the analog signal therethrough to the corresponding ones of said plurality of sample-and-hold circuits.

3. The processor of claim 2 wherein said memory module comprises:
   a plurality of memory chips operatively connected to said A/D module;
   a plurality of intervening latches operatively connected in an alternate fashion between said A/D module and said plurality of memory chips; and
   a plurality of memory module interface latches operatively connected at their inputs to the $0^{th}$, $6^{th}$ and $28^{th}$ memory chip so as to pass the signal from said A/D module to said ALU module in a "bucket brigade" fashion.

4. The processor of claim 3 wherein said ALU module comprises:
   an adder/substractor (A/S) circuit;
   an A/S circuit input latch operative connected between a data bus and the input of said A/S circuit;
   an A/S circuit output latch operatively connected between the output of said A/S circuit and the data bus;
   a multiplier operatively connected to the data bus;
   an ALU module random access memory (RAM) operatively connected to the data bus;
   an ALU module read-only memory (ROM) operatively connected to the data bus;
   a less-than-zero detector operatively connected to the data bus;
   a sign fill circuit operatively connected to the data bus;
   a first accumulator latch operatively connected between the data bus and said CPU module; and
   a second accumulator latch operatively connected between the data bus and said CPU module.

5. The processor of claim 4 wherein said control module comprises:
   a two-phase clock generator having first and second phase outputs;
   a synchronization circuit being operatively connected to the first phase output of said two-phase clock generator, and being operatively connected at another input to said CPU module;
   an address counter operatively connected to said synchronization circuit and said CPU module;
   a plurality of control read-only memories (ROMs) operatively connected to the output of said address counter; and
   a plurality of control ROMs output latches operatively connected to the second phase output of said two-phase clock generator, the output of corresponding ones of said plurality of control ROMs and to a control bus so as to feed corresponding ones of said plurality of ALU modules, said memory and said A/D modules.

* * * * *